United States Patent [19]

Janssen et al.

[11] 4,219,849
[45] Aug. 26, 1980

[54] TELEVISION RECEIVER HAVING A CONTROLLABLE SOUND SUPPRESSION FILTER

[75] Inventors: Peter J. H. Janssen; Hendrik Kolk; Wilhelmus J. Christis, all of Eindhoven, Netherlands

[73] Assignee: U.S. Philips Corporation, New York, N.Y.

[21] Appl. No.: 962,830

[22] Filed: Nov. 21, 1978

[30] Foreign Application Priority Data

Nov. 23, 1977 [NL] Netherlands ............... 7712887

[51] Int. Cl.² .............................................. H04N 5/62
[52] U.S. Cl. ................................. 358/197; 358/21 R
[58] Field of Search ................. 358/21 R, 165, 192, 358/197

[56] References Cited

U.S. PATENT DOCUMENTS

| | | | |
|---|---|---|---|
| 2,810,014 | 10/1957 | Squires | 358/21 |
| 2,896,015 | 7/1959 | Smith | 358/197 X |
| 3,740,460 | 6/1973 | Ong | 358/197 |

FOREIGN PATENT DOCUMENTS 2812895 10/1978 Fed. Rep. of Germany ............ 358/197

Primary Examiner—James W. Moffitt
Assistant Examiner—Aristotelis M. Psitos
Attorney, Agent, or Firm—Thomas A. Briody; William J. Streeter; Edward W. Goodman

[57] ABSTRACT

An effective control of the degree of suppression in a sound suppression filter in a television receiver is obtained when the required control signal is derived from the product of the amplitudes of the sound intercarrier signal and the chrominance sub-carrier signal, this product being in practice a measure of the disturbing difference frequency component between the chrominance sub-carrier signal and the sound intercarrier signal.

2 Claims, 2 Drawing Figures

TELEVISION RECEIVER HAVING A CONTROLLABLE SOUND SUPPRESSION FILTER

BACKGROUND OF THE INVENTION

The invention relates to a television receiver having a sound intercarrier signal path and, incorporated before the point where a television signal path is split into the sound inter-carrier signal path and a video signal path, a controllable sound suppression filter having a control signal input for supplying a control signal for controlling the degree of sound suppression, the control signal input being coupled to the output of a product amplitude detection circuit by means of which the amplitude of a product signal of carriers from the television signal can be detected.

German Patent Specification No. 905,377 discloses a television receiver of the type defined above, with which the degree of sound suppression can be controlled by applying a control signal, derived from the amplitude of the sound intercarrier signal, to the sound suppression filter. This sound intercarrier signal is a mixed product of a video carrier signal and a sound carrier signal. When a given television signal is received, the amplitude of the sound intercarrier signal remains substantially constant so that substantially no change occurs thereafter in the degree of sound suppression. The degree of sound suppression must then be so low that the sound intercarrier amplitude remains sufficiently high to enable a proper sound quality and of such a high value that the video signal is not disturbed by the sound signal.

SUMMARY OF THE INVENTION

Applicants found that when applying a sound suppression control in which the control is performed by the intercarrier signal amplitude, it is not possible to achieve the most favourable conditions for a proper sound quality. It is an object of the invention to provide a control system which promotes a better sound quality, the suppression of the sound intercarrier required for the picture quality remaining good at the same time.

A television receiver as specified in the preamble is therefore characterized in that the product amplitude detection circuit comprises a circuit for detecting the product of the amplitude of a sound intercarrier and the amplitude of a chrominance sub-carrier from a received television signal.

By having the control signal influenced by a combination of the sound intercarrier amplitude and the chrominance sub-carrier amplitude, the control system can be adjusted so that, with a low amplitude of the chrominance sub-carrier, the attenuation of the sound suppression filter can be made so low that the interference in the sound is brought to a minimum. When tuning to a given transmitter, the control system then takes the amplitude of the chrominance sub-carrier signal into account, which rarely is at its maximum amplitude, and consequently rarely exercises a maximum disturbing influence.

The invention will now be further explained with reference to the drawing.

DESCRIPTION OF THE PREFERRED EMBODIMENTS

Figure 1:
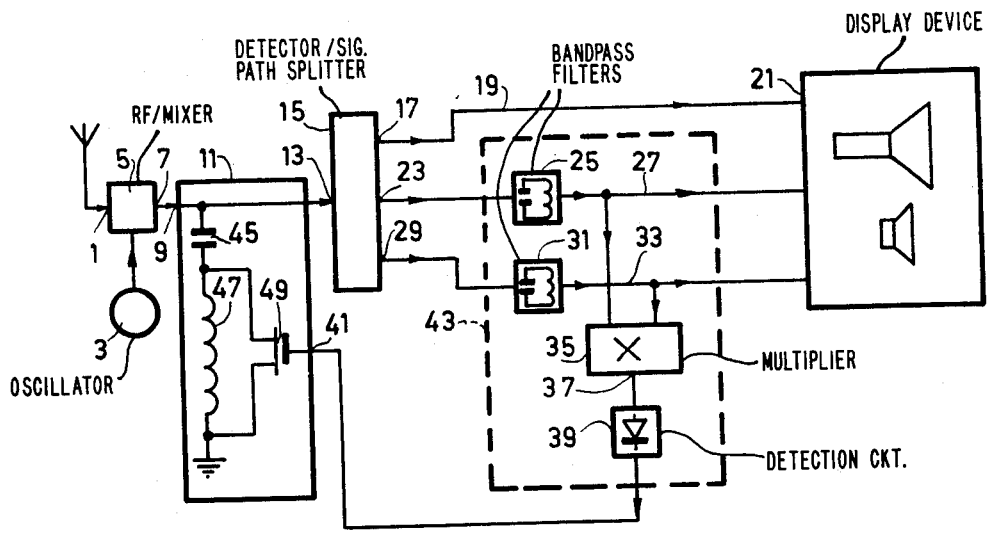
FIG. 1 illustrates, by means of a block diagram, a possible embodiment of a television receiver according to the invention.

In FIG. 1 a received television signal is applied to an input of a radio-frequency and mixer section 5, which is further coupled to an oscillator 3. The radio-frequency and mixer section 5 then supplies at an output 7 thereof an intermediate frequency television signal which is applied to input 13 of a detection and signal path splitting circuit 15 via a television signal path 9 incorporating a sound suppression filter 11. The detection and signal path splitting circuit 15 supplies, at an output 17, a video signal which is applied, via a video signal path 19, to a display device 21, at an output 23, a sound intercarrier signal, (having a frequency of 5.5 MHz for a European television signal) which is applied via a bandpass filter 25 and a sound intercarrier signal path 27 to the display device 21, and at an output 29, a chrominance sub-carrier signal (having a frequency of 4.43 MHz for a European television signal) which is applied to the display device 21 via a bandpass filter 31 and a chrominance signal path 33.

In addition, the signal paths 27 and 33 are each connected to an input of a multiplier circuit 35. If this circuit does not limit and also the intercarrier signal path and the chrominance sub-carrier signal path do not comprise limiters, this multiplier circuit 35 supplies at an output 37 a signal the amplitude of which corresponds to the product of the amplitude of the sound intercarrier signal and the chrominance sub-carrier signal. The amplitude is then converted by a detection circuit 39 into a corresponding d.c. voltage which is supplied to a control signal input 41 of the sound suppression filter 11. The filters 25, 31, the multiplier circuit 35 and the detection circuit 39 constitute a product amplitude detection circuit 43.

The sound suppression filter 11 is constituted by a circuit having a capacitor 45 and an inductance 47. A field effect transistor 49, whose gate electrode is connected to the input 41 and to which the control signal is supplied, is connected in parallel to the inductance 47.

With a large amplitude of the signal at the output 37 of the multiplier circuit, the field effect transistor 49 must constitute a very low damping for the series circuit 45, 47 to cause a considerable sound carrier suppression. Normally, when the amplitude of the chrominance sub-carrier is large, a pronounced cross-talk from the sound intercarrier signal to the video signal is produced so that the latter is seriously disturbed by a signal of the difference frequency of the sound carrier and the chrominance sub-carrier (in this case 1.1 MHz). However, this is prevented by the above suppression. If the amplitude of the chrominance sub-carrier signal is low, substantially no disturbing 1.1 MHz component will occur. In that case the field effect transistor 49 constitutes a large damping for the series circuit 45, 47, due to the control systems, and a larger sound signal amplitude is obtained, enabling a proper sound quality. The picture quality is then also good because substantially no 1.1 MHz component occurs.

So the control system utilizes a control signal which depends in substantially the same manner on components which also determine the disturbing 1.1 MHz. However, this 1.1 MHz signal can substantially not be separated from the television signal because a large plurality of components of the video signal are located in that frequency range.

Figure 2:
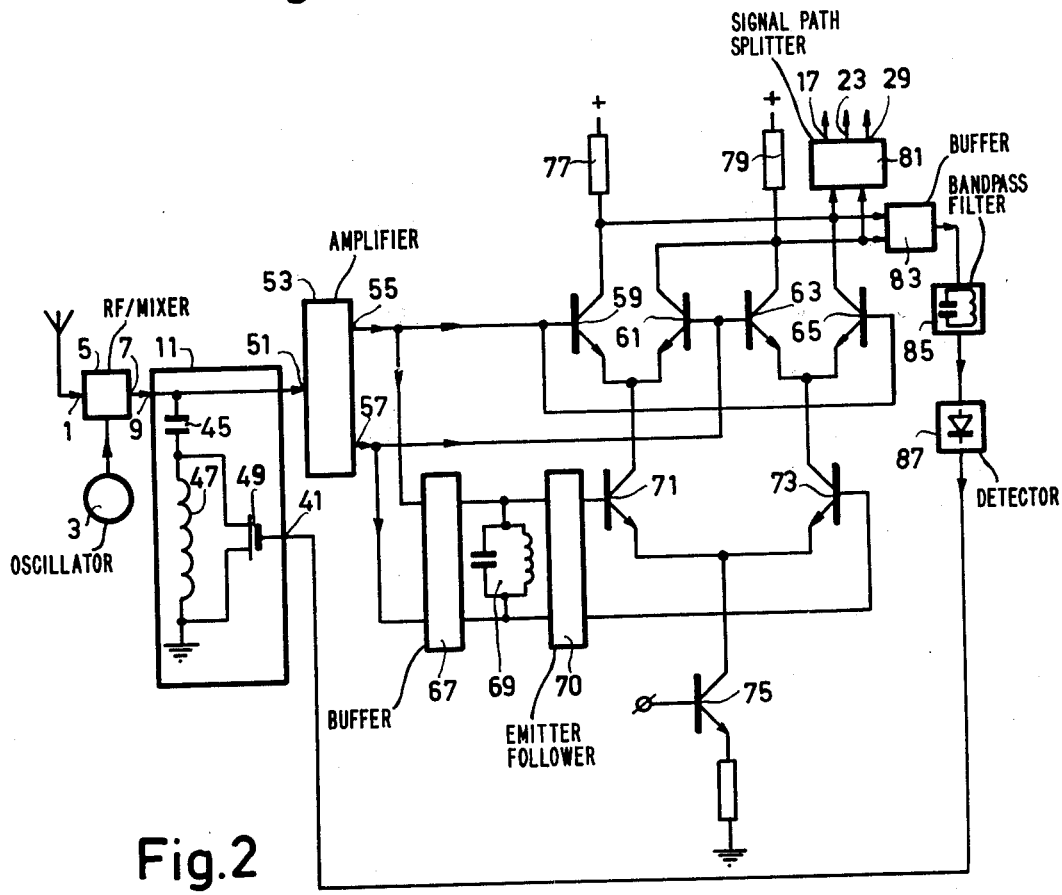
FIG. 2 illustrates, also by means of a block diagram, a further possible embodiment of a television receiver according to the invention.

In FIG. 2 corresponding components have been given the same reference numerals as in FIG. 1. For the description reference is made to the description of FIG. 1.

The signal originating from the sound suppression filter 11 is applied in this case to an input 51 of an amplifier 53 having push-pull outputs 55, 57 which are connected, on the one hand directly to the bases of four transistors 59, 65 and 61, 63, respectively, and on the other hand, via a buffer stage 67, a circuit 69 tuned to the picture intermediate frequency and an emitter follower stage 70, to the bases of two transistors 71, 73, respectively. The transistors 59, 61, 63, 65, 71 and 73 form, together with a transistor 75, used as a direct current source, and two load resistors 77, 79, a synchronous detector which supplies a balanced output signal to a signal path splitter 81 and to a buffer stage 83. The video signal, the sound intercarrier signal and the chrominance sub-carrier signal are obtained at the outputs 17, 23, 29 of the signal path splitter 81.

Second harmonics of the base band of the television signal do not occur in the output signal across the load resistors 77, 79 of the synchronous detector. In this case a 9.9 MHz component is produced as a product of the video carrier, the sound carrier and the chrominance sub-carrier. This component, which has an amplitude proportional to that of the disturbing 1.1 MHz component, is filtered from the output signal of the buffer stage 83 by means of a bandpass filter 85, which is tuned in this case to 9.9 MHz, and applied to a detector 87. This detector 87 now supplies the control signal to the control signal input of the sound suppression filter 11 and, together with the buffer 83 and the circuit 85, constitutes the product amplitude detection circuit.

Although the sound suppression filter is included, in the above examples, in the intermediate frequency section of the receiver, it may also be provided in a different place in the common signal path to the signal path splitter and the product amplitude detection circuit.

What is claimed is:

1. A television receiver having a chrominance sub-carrier signal path, a video signal path and a sound intercarrier signal path and, incorporated before the point where a television signal path is split into the chrominance sub-carrier signal path, the sound intercarrier signal path and the video signal path, a controllable sound suppression filter having a control signal input for applying a control signal for controlling the degree of sound suppression, and a product amplitude detection circuit coupled to said control signal input, wherein the product amplitude detection circuit comprises a circuit for detecting the product of the amplitude of a sound intercarrier signal and the amplitude of a chrominance sub-carrier signal from a received television signal.

2. A television receiver as claimed in claim 1, wherein the product amplitude detection circuit further comprises a bandpass filter, arranged behind a synchronous picture detection circuit, for passing signals with the sum frequency of the sound intercarrier signal and the chrominance sub-carrier signal, and an amplitude detection circuit coupled to said bandpass filter.

* * * * *